S. J. BEACH.
OPTICAL INSTRUMENT.
APPLICATION FILED FEB. 21, 1921.

1,389,092.

Patented Aug. 30, 1921.

Inventor:
Sylvester J. Beach
by S. W. Bates
Atty.

UNITED STATES PATENT OFFICE.

SYLVESTER JUDD BEACH, OF PORTLAND, MAINE.

OPTICAL INSTRUMENT.

1,389,092.  Specification of Letters Patent.  Patented Aug. 30, 1921.

Application filed February 21, 1921. Serial No. 446,796.

*To all whom it may concern:*

Be it known that I, SYLVESTER J. BEACH, a citizen of the United States, residing at Portland, in the county of Cumberland and State of Maine, have invented certain new and useful Improvements in Optical Instruments, of which the following is a specification.

My invention relates to optical instruments such as are used for testing the visual field of the eye.

The tests and measurements in the visual field of the eye have usually been made by holding the eye in a fixed position in front of a flat surface as a black-board and the difficulty with such tests is that the lines of sight as they leave the visual center and are projected upon the flat surface increase in distance from the eye rapidly and the vision is much distorted. These tests and measurements have also been made with a hemispherical surface with the eye located at the center of curvature but the difficulty with this device was that it could not be properly lighted particularly by day light and the inside surface of the instrument and the eye of the patient could not be watched by the oculist on account of the over-hang of the upper portion of the hemisphere.

According to my invention, I construct my instrument with a concave surface having a spherical section to which is connected a cylindrical surface with a rest for the face or head to bring the eye in the spherical center of curvature. The cylindrical surface is held in a vertical position and forms the upper end of the instrument so that the oculist can look over the top to manipulate the test object and observe the eye and light can be admitted from above, daylight as well as artificial light.

The device is made right handed or left handed, one for each eye. An important feature of the instrument is the nose rest which is formed at the end of an arm removably attached to a socket at the side of chart with a blinder secured to the arm adjacent to the nose rest.

I have illustrated my invention by means of the accompanying drawing in which is shown the form of the device which I prefer to use.

Figure 1:
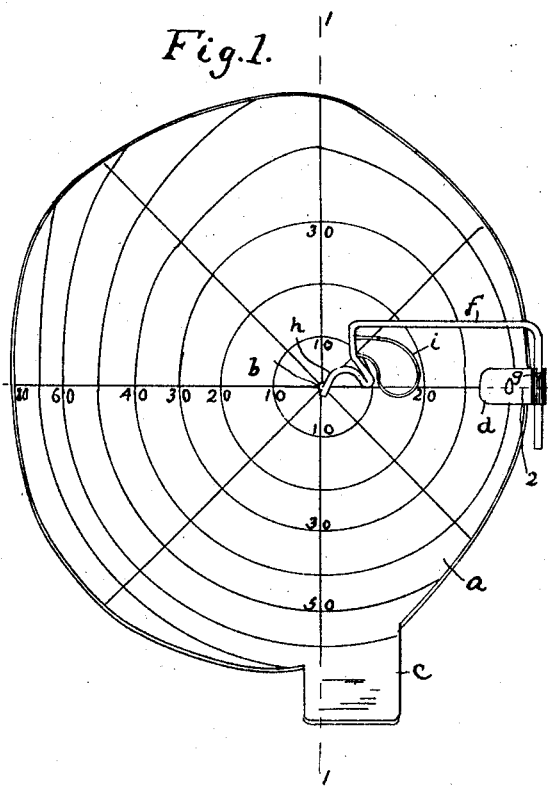
Figure 1 is a front elevation.
Figure 2:
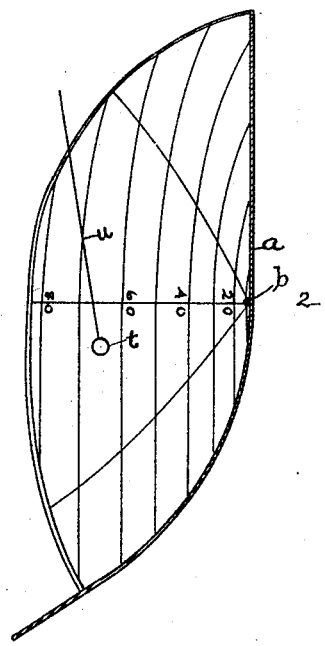
Fig. 2 is a section on the line 1—1 of Fig. 1.
Figure 3:
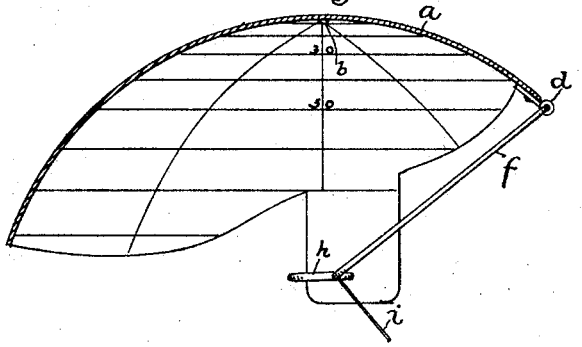
Fig. 3 is a section on the line 2—2 of Fig. 1.

The instrument is made of thin material bent or otherwise formed to produce the required surfaces. In practice, I make use of papier mâché formed as hereafter set forth. The lower portion of the instrument is in the form of a hemisphere of which the center is a distance of $7\frac{1}{2}$ inches and the upper half is a cylinder extending upward and of the same curvature as the hemisphere.

Referring to the drawing, *a* represents the instrument of which *b* is the visual center. Radiating from the point *b* are vertical, horizontal and diagonal lines with a series of concentric circles ten degrees apart. These circles are numbered from 10 up to 80 which is the perimeter of the field of vision at the side of the eye.

The instrument here shown, is for the left eye and consequently it is the left side of the chart that is designed to be used. The circles in the lower hemispherical section are the same angular distance apart with relation to the eye which is the radial center of the hemisphere. The lines in the upper half are projections of the corresponding lines of a hemisphere, the complement of the lower hemisphere if they were extended to meet the cylindrical surface.

The perimeter of the instrument is cut away on a line which indicates the normal limit of vision and this forms an automatic means of testing for normal vision.

For holding the instrument in position so that the eye will be in the focus, I make use of a nose piece *h* formed on the end of a horizontal arm *f*. This arm *f* is turned down at the end to fit a socket *d* which is secured at one side of the instrument. The socket has a slot in its upper end and a pin *g* on the arm fits in this slot and prevents the arm from turning and holds it firmly in place.

The arm may thus be readily lifted out and put back in place. On the arm adjacent to the nose piece, is a support for a blinder consisting of a wire loop *i* on which may be laid a piece of opaque material to act as a blinder. A permanent blinder may be used if desired, formed in any suitable manner.

The instrument is used by placing the nose piece over the nose of the patient, putting the blinder over the eye not being used and then moving the test object which may be a small white disk, as *t*, attached to a small stem or handle *u* into different positions along the limits of the field until it can just be seen. The limit of vision is thus found and may be recorded on diagrams corresponding with the lines on my instrument. This device forms a very accurate and quickly applied and convenient instrument for the purpose and will save much time for the busy doctor in testing eyes. The curved lines are made preferably of glossy black on a dull black background so that the test object can be clearly seen and located.

I claim:—

1. A device for testing the visual field of the human eye, consisting of a concave chart having at its lower portion a spherical section with a cylindrical section connected therewith.

2. A device for testing the visual field of the human eye, consisting of a concave chart having at its lower portion a spherical section with a cylindrical section connected therewith and a nose rest for bringing the eye at the center of curvature of the spherical section.

3. A device for testing the visual field of the human eye, consisting of a concave chart having a socket secured to the perimeter thereof, an arm removably held by said socket, a nose rest on said arm to position one eye at the radial center of said chart and a blinder on said arm adjacent to the nose rest for blinding the opposite eye.

4. A device for testing the visual field of the human eye, consisting of a concave chart having a socket secured to the perimeter thereof, an arm removably held by said socket, a nose rest on said arm to position one eye at the radial center of said chart and a support on said arm adjacent to said nose rest for holding a piece of opaque material for covering the opposite eye.

5. A device for testing the visual field of the human eye, consisting of a sheet of thin material formed into a concave chart having a spherical section and a cylindrical section connected therewith, with concentric lines surrounding the visual center and a rest for positioning the eye in the spherical center.

SYLVESTER JUDD BEACH.